Aug. 30, 1960         T. MARINER         2,951,159
METHOD AND APPARATUS FOR MAKING REPETITIVE MEASUREMENTS
Filed May 4, 1953
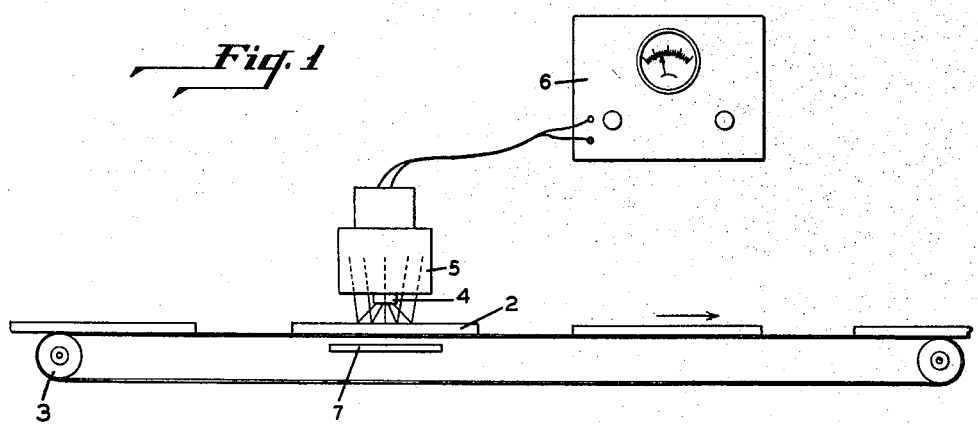
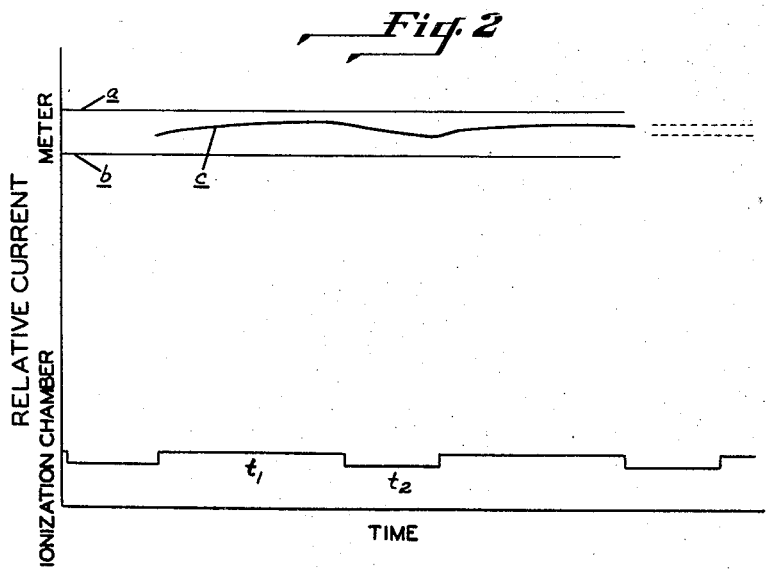
INVENTOR
THOMAS MARINER
by
ATTORNEY

United States Patent Office 2,951,159
Patented Aug. 30, 1960

2,951,159

METHOD AND APPARATUS FOR MAKING REPETITIVE MEASUREMENTS

Thomas Mariner, Mount Joy, Pa., assignor to Armstrong Cork Company, Lancaster, Pa., a corporation of Pennsylvania Filed May 4, 1953, Ser. No. 352,667

2 Claims. (Cl. 250—83.3)

This invention relates to a method and apparatus for making repetitive measurements and is concerned particularly with the measuring of spaced specimens moving through a measuring station where the measuring device is stimulated intermittently by the presence of the specimens moving through the station. The invention is useful also where a series of spot measurements are made and the specimens to be measured are positioned, one at a time, in the measuring zone either mechanically or by hand.

As an illustration of the field to which this invention is directed, reference will be made to the measurement of the thickness of a film of lithographic ink and varnish on tin-coated steel sheets travelling in spaced relationship from a lithographing machine into a baking oven where the ink and varnish are dried or cured. Such measurement may be performed by a backscattering type beta-gauge which can measure nondestructively the thickness of the coating on the metal plate. Such beta-gauges have a relatively long time constant, in the order of three seconds, which is greater than the interval during which a specimen is travelling through the measuring zone and stimulating the beta-gauge. During the interval between sheets, the gauge is responding to a stimulus of a different order of magnitude normally due to air, and errors normally arising from the natural time constant of the device are greatly magnified and significant measurements are impossible.

It is an object of this invention to provide a method and apparatus which will present substantially equivalent stimuli to the device during nonmeasuring as well as measuring periods.

Another object of this invention is to provide a method and apparatus which will produce accurate periodic repetitive measurements even though the measuring time be about equal to or less than the time constant of the measuring device.

A further object of the invention is to provide a method and apparatus for measuring moving specimens passing in spaced sequence through a measuring zone which will provide a continuous indication of average measurements, free of substantial variations due to the spacing between the moving specimens.

An additional object of the invention is to provide a method and apparatus for measuring moving specimens in spaced order which will not be substantially affected in the accuracy of its measurement due to allowable tolerances in the length of the specimens being measured or allowable tolerances in the spacing between specimens.

According to the principle of the present invention, a measuring device, such as a backscattering beta-gauge, is positioned to respond to the stimuli of specimens to be measured while in a measuring zone; and, during the intervals between specimens, the device is impressed with a reference signal the magnitude of which is substantially equal to the signal effected by a specimen of a desired standard. This is preferably accomplished by stimulating the measuring device with a reference sample or standard object during the nonmeasuring intervals.

The brief general statement of the operation of a beta-gauge which follows will aid in an understanding of the invention. A beta-gauge measures the magnitude, or variations in the magnitude, of thickness or weight per unit area of a material, after suitable calibration of the device with known thicknesses or weights per unit area of the material in question. The essential component parts of a backscattering beta-gauge are: (1) a source of electrons of suitably high energy (around $10^6$ volts) usually housed in an gauging head positioned closely adjacent to the specimen to be measured; (2) an electron detector such as a Geiger-Müller counter or, preferably, an ionization chamber positioned to receive the electron current deflected or scattered back from the specimen; (3) an amplifier to raise the current from the electron detector to such a level as will conveniently actuate common types of meters and recorders; (4) a meter or recorder or both to indicate and/or record the magnitude of the electron current reaching the electron detector. In addition, it is customary to incorporate a balancing circuit in the amplifier in order effectively to cancel out part of the electron current to the detector, so that only variations are read on the indicator or recorder.

In the backscattering beta-gauge, the electron current to the detector is essentially zero when no material is placed in front of the electron source in the gauging head. If a thin sheet of material is placed in front of the gauging head, some electrons are scattered back to the detector and a finite current is produced in the electron detector. As the thickness of the sheet is increased, more electrons are scattered back and the current increases. Thus, the current when suitably amplified can be used as an indication of the thickness of the material. Successive increments in thickness will not, of course, give rise to so large an increment in electron current as did a preceding thickness increment of equal size. This can most easily be seen by considering the successive increments in thickness to be added to the back of the sheet. Each successive increment will have fewer of the initial electrons impinging upon it, owing to the scattering and absorption of electrons on the longer return path to the detector. As a result, as the thickness of the material increases, the current at the detector will approach a saturation current which is characteristic of the material for a given source strength, electron energy spectrum, and geometrical arrangement.

If the base material is supplied with a surface coating of another material, the thickness of which is to be measured, the sheet will be arranged with the surface coating facing the source and ionization chamber, and the current to the latter will be higher or lower than the current due to the base material, depending (to a first approximation) on whether the coating is of higher or lower atomic number than the base material. As the thickness of the surface coating increases, the current in the ionization chamber will approach a saturation value characteristic of the coating material for a given source strength, electron energy spectrum, and geometrical arrangement. If the thickness of the base material is known or constant so that the current due to its presence is constant, the total current in the ionization chamber is then a measure of the thickness or weight per unit area of the surface coating, after suitable calibration with known thicknesses or weights per unit area of the material in question.

In order to minimize fluctuations in the indicating meter or recorder, commercially available backscattering beta-gauges are normally arranged with a time constant of several seconds. These fluctuations result from the fact that with sources of electrons in a beta-gauge of customary intensity there is a relatively large statistical fluctuation in the primary electron current which gives rise to troublesome erratic motions of the indicating meter or recording instrument associated with the gauge. This fluctuation, of course, decreases percentagewise as the intensity of the source is increased. However, extremely strong sources are not desirable because they are uneconomical of rare radioactive material and may expose personnel to some danger. As a consequence, stabilization of the meter readings for a fixed set of conditions requires that the response of the amplifier and/or meter be slowed down, and thus a time constant or response time of several seconds is provided in the instrument.

In cases where the beta-gauge is used for static measurements, the time constant simply lengthens the time required to get a measurement and thus gives a more slowly acquired but more stable reading than would be obtained with an immediately reacting system. In the case of an unbroken, continuously moving sheet, the long time constant again means that the average sheet thickness will be indicated accurately by a fairly steady meter reading; but, in addition, it means that the indicated average measurement applies to a section of the sheet which passed a moment earlier.

For broken or discontinuous sheets which require for passing the gauging head a time long relative to the time constant of the instrument, the meter reading will reach a stable value for each sheet after a transient response due to the gap between sheets, so that the situation is not significantly different from that applying for continuous sheets. When the time of passage of successive individual sheets is the same order of magnitude as or smaller than the time constant of the gauging equipment and the space between the sheets is a significant fraction of the sheet length, the meter reading will never reach a stable value and reading will be difficult.

In applying the backscattering beta-gauge in the customary way to the measurement of coating on tin-plated steel sheets with the sheets moving continuously but in spaced relationship through the measuring zone, the gauging head which carries the electron source may be disposed a slight distance, a little less than ½", for instance, above the moving sheets. The source of electrons may be a concentration of a long-lived radioactive isotope such as strontium-90, half life 25 years, maximum electron energy $0.65 \times 10^6$ volts. While a coated sheet is under the gauge, a current determined by the weight per unit area of the coating will be produced in the ionization chamber of the gauge, assuming the metal sheet to be of uniform gauge or the effective thickness of the sheet and its supporting backing to be infinite. But when the sheet has passed, the gauge will be viewing air and the current in the ionization chamber will be essentially zero. Thus assuming that the sheets are uniform in constitution, size, and spacing, the indicated current produced in the ionization chamber will fluctuate from a maximum when the sheet is passing under the gauge to a minimum in the interval between sheets. Where the time of passage of a sheet below the gauge is about equal to or less than the time constant of the measuring device, reasonably accurate average measurements cannot be obtained. Also errors introduced by variations in the length of the sheets and in the spacing between the sheets are of significant importance.

In accordance with the present invention, a reference signal is impressed upon the measuring device during the interval between the passage of sheets through the measuring zone. Preferably this is accomplished by disposing a reference object below the sheets being conveyed through the measuring zone, with the sheets acting as moving shutters to expose the reference object after they pass sequentially thereover. The reference object will be selected to provide a current (a reference signal) in the ionization chamber substantially equal to the current produced by a standard "on thickness" sheet. Thus if a sheet is "on thickness" the current produced in the ionization chamber will be the same as that produced on exposure of the reference object, and the ionization chamber current if plotted would be a straight line. Assuming, however, that the sheets are "off thickness" and the current in the ionization chamber is greater when the sheets are exposed to the gauge than when the reference object is exposed to the gauge, there will be a fluctuation of the meter current, depending upon the magnitude of the change in the condition of the gauged sheet which affects the ionization chamber current. This fluctuation will be small, however, as compared with a system where the gauge is "viewing" air (or other stimulus which differs greatly from that of the sheets being measured) in the interval between the passage of the spaced sheets.

In general it is desirable to control the thickness of coatings to better than ±10%. Thus it would be reasonable to use in the meter circuit a zero center meter registering 10%, either way. The balancing circuit would then be adjusted to eliminate the effect of the current arising from "on thickness" sheets. "On thickness" sheets will give rise to a reading at center scale, as will also the reference object. The amplification factor of the circuit will be adjusted so that the 10% marks on the meter (extreme limits of the scale either way from center) would correspond to 10% change in gauge of the coating. The thickness deviations above and below mean desired thickness would be read as the maximum departures of the needle from center scale.

The following example will illustrate the invention in detail. Reference is made to the accompanying drawing, in which:

Figure 1 is a schematic layout illustrating a backscattering beta-gauge positioned for measuring the surface coating on spaced metal sheets moving through a measuring zone; and Figure 2 is a chart which shows to a greatly exaggerated scale, meter current fluctuations occurring during gauging.

For purposes of illustration it will be assumed that the sheets are of tin-plated steel having a coating of lithographic ink and varnish thereon, the density of which is .90 mg./cm.$^2$, that the sheets are 3 feet long and spaced 1 foot apart, and that the feed rate is 240 feet per minute, i.e., 60 sheets per minute. Thus there will be a time relationship of $t_1 = .75$ second and $t_2 = .25$ second, where $t_1$ is the time interval of movement of a sheet through the measuring zone and $t_2$ is the time interval between the passage of the trailing edge of one sheet and the leading edge of the next adjacent sheet. It will be assumed that a 10% deviation in thickness may be encountered in the coating operation, or .09 mg./cm.$^2$. The time constant of the beta-gauge measuring equipment will be assumed to be 3 seconds.

Referring now to Figure 1, the sheets 2 which are received on a conveyor 3 of spaced belts are moving in the direction of the arrow. Mounted above the conveyor 3 in the measuring zone is a backscattering beta-gauge including a gauging head comprising a source 4 of energetic electrons, such as the radioactive isotope strontium-90 previously mentioned. An ionization chamber 5 constitutes an electron detector which is electrically connected to an amplifier and meter 6 and associated circuit elements previously described. Mounted below the upper reach of the conveyor 3 in an area between the spaced belts thereof for direct stimulation of the beta-gauge is a reference object 7 which will provide a current in the ionization chamber substantially equal to that provided by a standard "on thickness" sheet.

Figure 2 shows the relative current to a greatly exaggerated scale in the ionization chamber 5 and meter 6. While a coated sheet 2 is under the gauge during the interval $t_1$, the current in the ionization chamber will be greater or lesser than during the interval $t_2$ when the gauge is stimulated by the reference object 7, the difference in current depending upon the departure of the thickness of the coating on the sheet under examination from the specified standard for an "on thickness" sheet. In Figure 2 it has been assumed that the coating on all sheets is thinner by 10% than the desired standard coating thickness. If the conveyor 3 were stopped with the gauge "viewing" a coated sheet, a steady meter current, indicated by the line $a$ at the top of Figure 2, would be obtained; and if the conveyor were stopped so as to expose the reference object 7, a steady meter current, indicated by the line $b$, would be obtained, with the line $a$ representing a meter current provided by a 10% "off thickness" coating on the low side with a stationary sheet. Lines $a$ and $b$ would coincide if the coating on sheets 2 were of standard thickness.

With the conveyor 3 moving, the meter current will tend toward line $a$ during that part of the cycle in which a sheet 2 is exposed to the gauge and toward line $b$ when the reference object is exposed, thus providing a meter current form indicated by the exponential curve $c$. The meter current thus fluctuates between extremes established by the requirement that the change in meter current during the upward part of the cycle be equal to that during the downward part of the cycle. The dotted lines in Figure 2 indicate the magnitude of fluctuation of the meter curent. This is to an enlarged scale as previously noted.

Using a reference object and the sheet coating and speeds of movement noted above, it can be found mathematically that with a 10% change in coating thickness, meter current fluctuation and concomitant needle fluctuation relative to movement from its center scale position to its position indicating a 10% change in coating thicknes will be in the order of 8%; whereas, without a reference sheet, the fluctuation of the needle would be about 30 times (3000%) the amount of movement from center scale to its position indicating a 10% change in coating thickness. Obviously, meter needle motion of this magnitude cannot occur because of the presence of mechanical stops, but the velocity and inertial effects inevitably will result, for meter current fluctuations of this magnitude will occur when no reference object or other reference signal impressing arrangement is provided. Such major fluctuations of the needle where a reference object is not employed makes it difficult for an operator visually to observe important variations in actual thickness of the coating. Also the inertial effect of major movements of the meter needle make accurate meter readings difficult, if not impossible. In addition, actual errors of major significance in instrument reading arise in the absence of the use of a reference object or other reference signal impressing arrangement, while insignificant errors result when the present invention is employed. This can be established mathematically. For instance, with a spacing variation of 1/10 foot between sheets, the resulting error in thickness reading on the meter or recorder will be in the order of 2.1%, with a reference object, but would be 800% without it. The error in thickness reading due to a 1/32" sheet length variation will be an insignificant .023% with a reference object as compared with an 8.8% error without the reference object.

The errors where a reference object is not employed will be relatively larger for smaller thickness changes than the maximum 10% used in this illustrative example, for the reason that the meter current changes with smaller deviations from "on thickness" of the film will be smaller and thus the percentage deviation resulting from spacing tolerances and sheet length tolerances will be larger. With the reference object, the errors are not only minimized but are retained in a constant order of magnitude.

It will be clear from the above that the reading for a sheet 10% above or below the desired standard thickness of film will be in error by only .21% of the actual thickness where the normal sheet spacing of 12" is in error by 10% or 1.2". As noted above, this error in sheet spacing results in an error of 2.1% in the actual indicated gauge deviation. With a sheet length variation of 1/32" which leads to an error of only .023% in actual indicated gauge definition, the reading for a sheet 10% above or below desired thickness of film will be in error by only .0023% of actual thickness, an insignificant factor when considering other sources of error.

The important parameters in determining the usefulness of the invention are:

(1) The time constant of the measuring device (such as the backscattering beta-gauge) relative to the duration and repetition time of the measurements.

(2) The size of the deviations in response of the measuring device (resulting from changes in thickness, weight per unit area, etc.) relative to the absolute size of the difference in response between "measuring" (when the beta-gauge is viewing the material to be measured, for instance) and "nonmeasuring" conditions (when the gauge is viewing air).

The invention is particularly useful in a unit including a backscattering beta-gauge chiefly because the change in electron current due to absorption in the thin surface films is small compared to the total backscattered current due to the presence of a sheet in the gauging area. Where a backscattering gauge is used and the reference object may remain in position, being shuttered effectively by the passage thereover of the specimens to be measured, the arrangement of Figure 1 is preferred.

The principal advantages of the invention may be generalized as follows:

In repetitive measurements with a measuring time about equal to or less than the time constant of the device:

(a) Meter fluctuations are greatly reduced between measuring and nonmeasuring conditions so that reading is more readily and accurately accomplished. (This primarily refers to personal reaction and inertial overthrow of the indicator needle.)

(b) The dependence of the indicated measurements on the duration of the time of measurement and the duration of the time interval between measurements is greatly reduced, leading to greater accuracy. This refers to real and not personal errors.

I claim:

1. In a measuring apparatus for the nondestructive measurement of spaced specimens, the combination of a backscattering beta-gauge having a predetermined response time disposed in a measuring zone, a reference object the stimulus of which upon said gauge is substantially equal to the stimulus of a specimen which is standard for said specimens to be measured, said reference object being disposed in fixed position in said zone for stimulation of said gauge, a conveyor for carrying said spaced specimens through said measuring zone with the specimens disposed between said reference object and said gauge to serve as moving shutters to expose the reference object to said gauge continuously during the intervals between the passage of successive specimens through said measuring zone and to effectively block said reference specimen from stimulation of said gauge during passage of said specimens through said zone, and means for moving said conveyor at such rate that the time of passage of each successive specimen is smaller than the response time of said gauge.

2. In a method of nondestructive measurement of spaced specimens moving along a fixed path through a measuring zone with a backscattering beta-gauge having a predetermined time response, the steps comprising: disposing in fixed position in said zone for stimulation of said gauge a reference object the stimulus of which upon said gauge is substantially equal to the stimulus of a specimen which is standard for said specimens to be measured, moving said specimens to be measured in spaced sequence along said path through said zone at such rate that the time of passage of each successive specimen is smaller than the time constant of said beta-gauge and said specimens serve as moving shutters to expose the reference object to said beta-gauge continuously during the intervals between the passage of successive specimens through said measuring zone and effectively block said reference object from stimulation of said gauge during passage of said specimens through said zone, stimulating said beta-gauge successively by said specimens during their travel through said measuring zone, and continuously stimulating said beta-gauge by said reference object during the intervals between the passage of successive specimens through said measuring zone.

References Cited in the file of this patent

UNITED STATES PATENTS

| | | |
|---|---|---|
| 2,280,948 | Gulliksen | Apr. 28, 1942 |
| 2,395,482 | Hurley | Feb. 26, 1946 |
| 2,486,946 | Herzog | Nov. 1, 1949 |
| 2,549,402 | Vossberg | Apr. 17, 1951 |
| 2,570,288 | Todd | Oct. 9, 1951 |
| 2,618,751 | Fearnside et al. | Nov. 18, 1952 |
| 2,714,669 | Wuppermann | Aug. 2, 1955 |